United States Patent [19]

Knudsen, deceased et al.

[11] 4,168,909
[45] Sep. 25, 1979

[54] OPTICAL TOE GAUGE WITH ANGLED SCREENS FOR VEHICLE WHEELS

[75] Inventors: Raymond G. Knudsen, deceased, late of Kenosha, Wis., by E. M. Miller, executor; James W. Nelson, Union Grove, Wis.

[73] Assignee: Snap-On Tools Corporation, Kenosha, Wis.

[21] Appl. No.: 850,244

[22] Filed: Nov. 10, 1977

[51] Int. Cl.$^2$ .............................................. G01B 11/26
[52] U.S. Cl. ................................ 356/155; 33/203.18
[58] Field of Search ............................ 33/203.18, 288; 356/154, 155

[56] References Cited
U.S. PATENT DOCUMENTS

| | | | |
|---|---|---|---|
| 3,307,263 | 3/1967 | Castiglia et al. | 365/155 |
| 3,901,604 | 8/1975 | Butler | 356/155 |
| 3,953,134 | 4/1976 | Appel et al. | 356/155 |

*Primary Examiner*—John K. Corbin
*Assistant Examiner*—R. A. Rosenberger
*Attorney, Agent, or Firm*—Vogel, Dithmar, Stotland, Stratman & Levy

[57] ABSTRACT

An optical toe gauge for measuring the toe-in and toe-out of vehicle wheels includes a pair of support arms respectively mounted from the wheel hubs and carrying light beam projector assemblies at the forward ends thereof so that the direction of each beam is dependent upon the toe of the associated wheel. Each arm also carries therebelow a screen on which is projected the beam from the opposite projector, each screen being disposed at approximately a 45° angle to the corresponding wheel axis and facing inwardly between the wheels, each screen having toe increment lines thereon with enlarged spacing therebetween to facilitate reading of the toe measurement on the screen.

9 Claims, 8 Drawing Figures

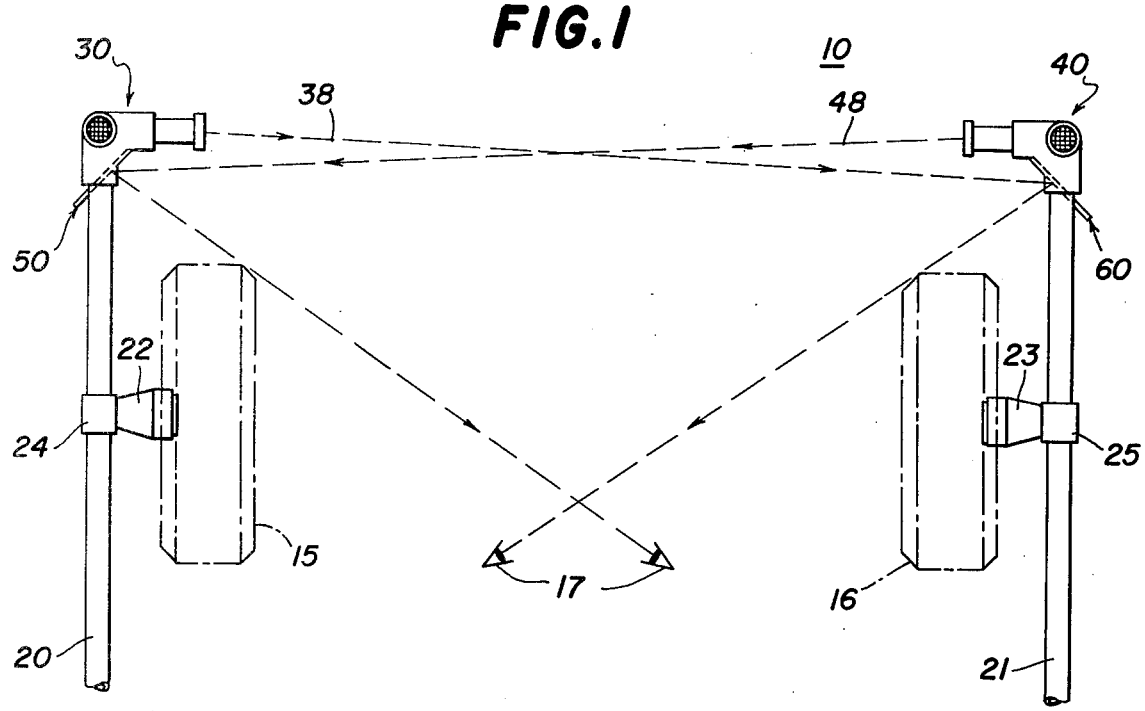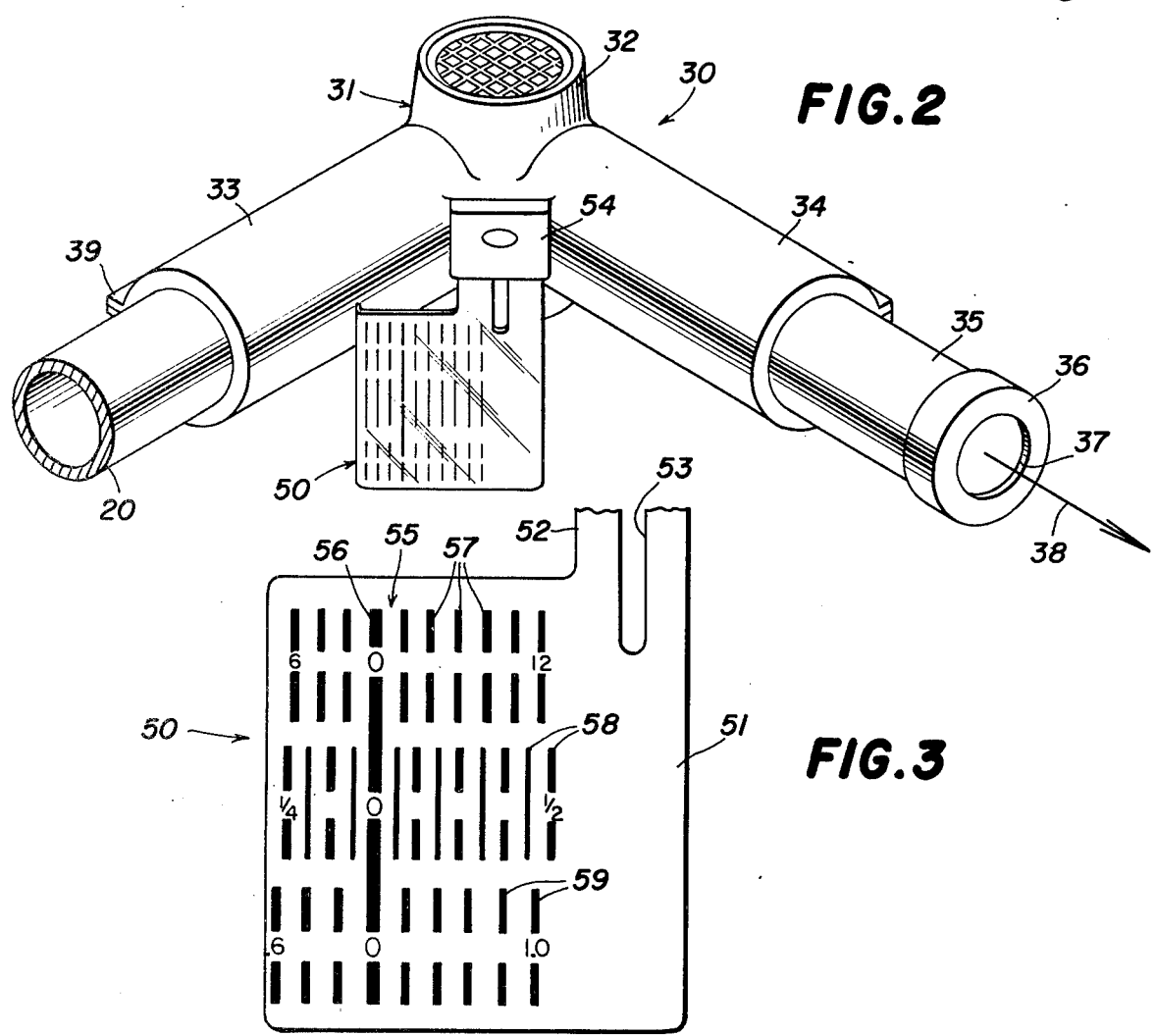

OPTICAL TOE GAUGE WITH ANGLED SCREENS FOR VEHICLE WHEELS

BACKGROUND OF THE INVENTION

The present invention relates to automotive wheel alignment apparatus and, more particularly, to optical apparatus for measuring the toe-in and toe-out of the front wheels of automotive vehicles. (As used herein, the term "wheel" refers to the combination of a metal wheel and a tire thereon.)

Such apparatus is disclosed, for example, in U.S. Pat. No. 3,953,134 issued to A. V. Appel et al. on Apr. 27, 1976, and U.S. Pat. No. 3,393,455 issued to C. W. MacMillan on July 23, 1968. Such prior art apparatus typically includes a pair of support arms respectively supported from the wheel hubs and extending forwardly of the wheels, either or both of said arms being provided at the forward end thereof with a light beam projector which projects a beam onto a screen supported by the opposite arm. Such prior art systems are broadly divided into single-projector systems wherein the screen and projector are supported from one arm and the other arm supports a mirror for reflecting the light beam, and two-projector systems wherein each arm carries its own projector and screen. In either type of system, the screen is disposed substantially parallel to the longitudinal axis of the support arm, i.e., substantially perpendicular to the axis of the associated wheel.

In using the prior art systems, the vehicle front wheels are typically driven onto a ramp which is either elevated above the garage floor or is suspended over a pit or well in the garage floor to permit an operator to position himself beneath and between the vehicle front wheels for access to the tie rods for making the necessary toe adjustments. Because of the position of the screens forward of the wheels and their orientation perpendicular to the wheel axes, it is difficult for the operator to read accurately the toe measurements on the screen from the toe adjusting position between the wheels, since the screens are disposed at relatively shallow angles to his lines of sight. The difficulty in reading the scales on the screens accurately is further aggravated by the fact that the specified toe dimensions for each wheel are typically only fractions of an inch and, likewise, the individual scale divisions on the screens are also separated by only fractions of an inch and are quite small. Accordingly, it is normally necessary for the operator to repeatedly move forwardly of the wheels to read the screen scale and then back to the adjustment position to make the necessary adjustment of the wheel tie rods until the screen indicates that the wheel has been set to the desired toe angle.

SUMMARY OF THE INVENTION

The present invention relates to an optical toe gauge which overcomes the disadvantages of the prior art toe gauges.

It is an important feature of the present invention that the screen or screens of the optical toe gauge are clearly visible and easily readable by an operator from his toe-adjusting position between the vehicle wheels.

More particularly, it is a feature of the present invention that the screens on which the light beams are projected are disposed at an acute angle to the axis of the associated wheel so as to be disposed approximately normal to the line of sight of the operator when he is in the toe-adjusting position between the vehicle wheels.

It is another important feature of this invention that the toe scale on each screen is enlarged, i.e., the toe increment lines are spaced apart a greater distance than normal thereby further to enhance visibility and readability thereof from the toe-adjusting position, while still giving an accurate indication of the toe angle.

These features are attained and it is an important object of this invention to afford these advantages by providing apparatus for measuring the toe of a vehicle front wheel, the apparatus comprising an elongated support arm, means fixedly mounting the arm with respect to the wheel with the arm extending forwardly of the wheel and parallel to a plane which is perpendicular to the axis of the wheel, a light beam projector fixedly carried by the arm adjacent to the forward end thereof so that the direction of the light beam is dependent upon the toe of the wheel, and a screen spaced from the projector for receiving the light beam projected therefrom and disposed at a predetermined acute angle with respect to the axis of the wheel so as to face toward and be clearly visible from a toe-adjusting location inboard of the wheel, whereby the toe of the wheel is indicated by the location at which the light beam is projected upon the screen.

Further features of the invention pertain to the particular arrangement of the parts of the optical toe gauge whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a fragmentary top plan view of optical toe gauge apparatus constructed in accordance with and embodying the features of the present invention.

FIG. 2 is an enlarged fragmentary perspective view of one of the projector and screen assemblies of FIG. 1, as viewed generally in the direction of the line of sight of the operator from his toe-adjusting position illustrated in FIG. 1.

FIG. 3 is a further enlarged fragmentary elevational view of the front of the screen illustrated in FIG. 2.

DESCRIPTION OF THE PREFERRED EMBODIMENT

Figure 4:
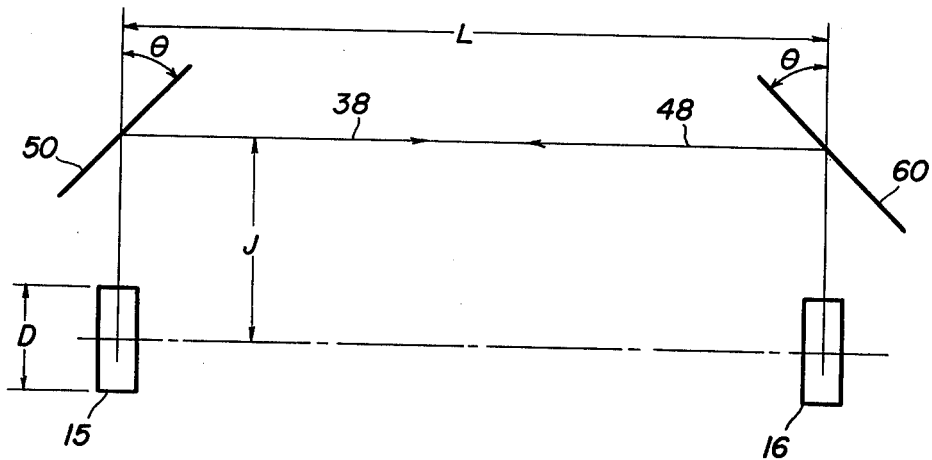
FIG. 4 is a diagrammatic top plan view of the apparatus of the present invention shown in a starting configuration with both wheels arranged in a straight-ahead or coaxial position.

Referring now to FIGS. 1 through 3 of the drawings, there is illustrated a toe measurement system, generally designated by the numeral 10, for measuring the toe of front wheels 15 and 16 of an automotive vehicle. Typically, the vehicle front wheels 15 and 16 are driven onto platforms beneath which is provided a work space from which a mechanic can adjust the toe of each wheel, normally by adjusting the tie rods, at an adjustment position beneath and between the front wheels approximately at the locations indicated by the diagrammatic eyes 17.

The toe measurement system 10 includes a pair of elongated support arms 20 and 21 respectively coupled to mounting assemblies 22 and 23 by couplings 24 and 25 for fixedly positioning the mounting assemblies 22 and 23 on the support arms 20 and 21. In use, the support arms 20 and 21 are respectively disposed alongside and outboard of the front wheels 15 and 16 generally parallel to the longitudinal axis of the associated vehicle. The mounting assemblies 22 and 23 are preferably magnetic and are adapted respectively to be magnetically secured to the hubs of the wheels 15 and 16 in a mounting position such that the support arms 20 and 21 extend forwardly of the wheels 15 and 16 and respectively lie in planes which are perpendicular to the axes of the wheels 15 and 16, all as is standard practice in the art.

Respectively fixedly secured to the support arms 20 and 21 at the front ends thereof are projector assemblies 30 and 40 which are constructed and arranged substantially as mirror images of each other, wherefore only the construction of the projector assembly 30 will be described in detail.

The projector assembly 30 includes an integral housing 31 having a hub portion 32 and two hollow tubular arms 33 and 34 extending from the hub portion 32 substantially at right angles to each other. The arm 33 is adapted to telescopically receive therein the forward end of the support arm 20, the arm 33 preferably being providing with a pair of back to back flanges 39 secured together by suitable means for tightly clamping the arm 33 on the support arm 20 coaxially therewith. Telescopically received in the arm 34 and extending a predetermined distance outwardly therefrom is a projection tube 35 closed at the outer end thereof by a cap 36 having a circular aperture 37 formed therein for permitting passage therethrough of a light beam 38.

Preferably, a projection bulb (not shown) is mounted in the hub portion 32 and is connected by suitable means to an appropriate source of electric power, the hub portion 32 being provided with grillwork at the upper and lower ends thereof to permit ventilation of the bulb. If desired, suitable lens and reticle structure (not shown) may be housed in the arm 34 to focus, shape and direct the light beam 38 from the bulb so that it is emitted from the aperture 37 substantially coaxially with the arm 34. The projector assembly 40 is similarly mounted on the support arm 21, for projecting a light beam 48, the projector assemblies 30 and 40 being oriented in use generally in facing relationship so that the light beams 38 and 48 therefrom are directed generally toward each other.

Respectively mounted on the projector assemblies 30 and 40 are a pair of screens 50 and 60 which are arranged substantially as mirror images of each other, wherefore only the screen 50 will be described in detail.

The screen 50 includes a generally rectangular platelike body 51 having an integral mounting arm 52 extending upwardly therefrom at one corner thereof. The mounting arm 52 is providing with a vertical slot 53 therein for receiving therethrough a suitable fastener such as a screw or bolt or the like (not shown) for fastening the mounting arm 52 to a mounting plate 54 substantially at the junction of the arms 33 and 34 of the projector assembly 30 so that the body 51 of the screen 50 is disposed substantially at a 45° angle to each of the projector assembly arms 33 and 34 and extends downwardly therebelow.

Formed on the inner surface of the screen 50 are indicia forming a scale or gauge, generally designated by the numeral 55, the indicia including a vertical reference line 56 and three groups of spaced-apart vertical toe increment lines 57, 58 and 59, each group of toe increment lines being arranged on both sides of the reference line 56, with the toe increment lines 57 being graduated in millimeters, and the toe increment lines 58 being graduated in inches the toe increment lines 59 being graduated in degrees of arc.

In use, the light beams 38 and 48 are so directed that they are respectively projected onto the screens 60 and 50, the light beams preferably being shaped so as to be narrow vertical beams which vertically span the three sets of increment lines 57, 58 and 59, so that an operator may read the toe setting in any one of the three sets of dimensions that he chooses. It will be understood that the directions of the light beams 38 and 48 are dependent upon the toe angles of the wheels 15 and 16, respectively. The toe measurement system is preferably calibrated after it is mounted on the vehicle wheel hubs so that the light beams respectively fall along the reference lines 56 when the wheels 15 and 16 arranged in the straight-ahead position illustrated in FIG. 4, wherein the wheels 15 and 16 are coaxial. In this initial setting, there is no toe on either wheel and, it will be understood, that as the toe angle of each wheel changes, its corresponding light beam will move horizontally across the scale of the opposite screen to give a visual indication of the amount of toe on the wheel, toe-in being indicated on one side of the reference line 56 and toe-out being indicated on the other side of the reference line 56, all in a well-known manner.

Referring to FIG. 1, it can be seen that the screens 50 and 60 are so oriented in use that they are approximately normal to the line of sight of the mechanic when he is in position for adjusting the toe dimension that is being indicated on that screen. Thus, the screen 50 or 60 and its scale 55 will be clearly visible to the mechanic from his toe-adjusting position so that he can continually read the toe dimension on the scale as it is being adjusted.

Furthermore, it will be understood that since the screens 50 and 60 are disposed at acute angles to the light beams projected thereon, as the light beam is moved across the scale, it moves a greater distance along the face of the screen for any given change in toe angle than it would if the screen were disposed substantially perpendicular to the light beam. Therefore, the toe increment lines 57, 58 and 59 are spaced farther apart than they would be if the screens 50 and 60 were perpendicular to the light beams 48 and 38, as in the prior art. This enlargement of the scale 55 serves further to facilitate the accurate readability thereof by the mechanic from his toe-adjusting position between the vehicle wheels 15 and 16. In practice, the toe increment lines 57, 58 and 59 may be spaced apart 1.5 to 2 times as far as in the prior art screens while still giving accurate indications of the toe dimension.

Referring now to FIGS. 4 through 8 of the drawings, the procedure for adjusting the toe of the front wheels 15 and 16 with the toe measurement system 10 will be described in greater detail. It will be understood that, for purposes of illustration, the toe angles $\phi$ have been exaggerated in FIGS. 4-8, these angles typically being only a fraction of a degree in actual practice. Because of this exaggeration in the toe angles, it has also been necessary to exaggerate the size of the diagrammatic representation of the screens 50 and 60, the planes of these screens being in general extended as far as necessary to accommodate the beam deflection for the toe angles depicted.

Toe is normally measured in inches and it is a distance which is equal to the difference of the spacing between the front wheels at their rear ends and the spacing therebetween at their front ends. The toe angle $\phi$ is determined by taking one-half of the total toe setting and applying it to each wheel. Thus, the toe angle $\phi = \text{SIN}^{-1}(T/2D)$, where T is the total toe setting and D is the wheel diameter.

Figure 5:
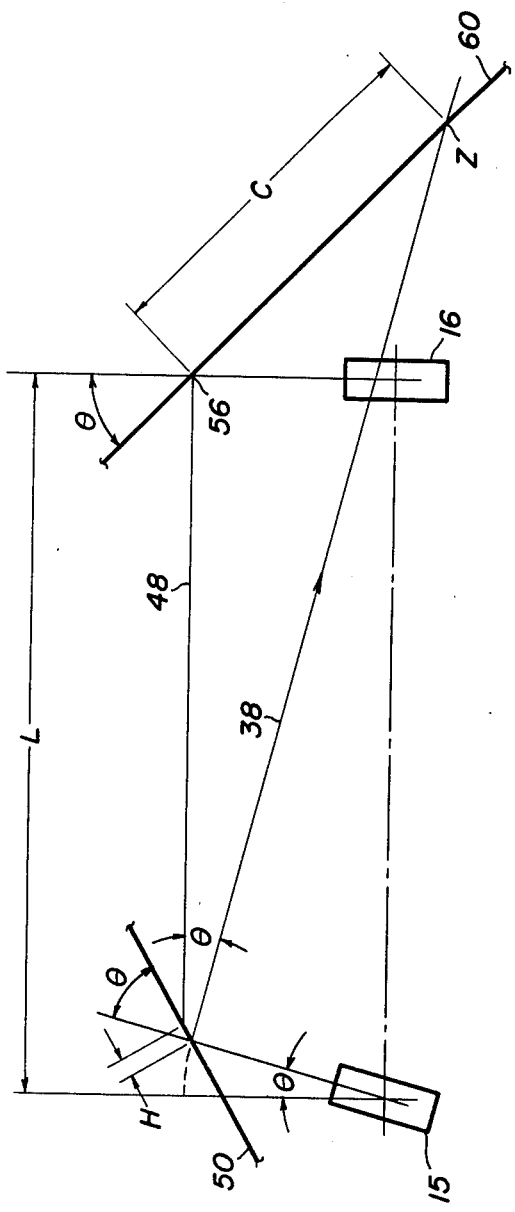
FIG. 5 is a diagrammatic view similar to FIG. 4, with one of the wheels adjusted to the proper toe-in angle.

During a standard toe-in adjustment both wheels are adjusted to point straight ahead as illustrated in FIG. 4, the distance from the axis of the wheel hubs to the longitudinal axis of the projector being designated by the letter J, and the lateral distance between the wheel centers being designated by the letter L. Each of the screens 50 and 60 is inclined at an angle $\theta$ with repsect to the longitudinal axis of the corresponding support arm 20 or 21. The left front wheel 15 is then adjusted with the tie rods to place one-half of the total toe T on this wheel. This adjustment is illustrated in FIG. 5, and when the wheel 15 is thus adjusted to a toe angle $\phi$ corresponding approximately to one-half the total toe setting, the light beam 38 will be projected on the screen 60 at a point Z which is spaced from the reference line 56 on screen 60 by a distance C. The C dimension is determined by the following equation:

$$C = \frac{[L - J(\frac{1}{\text{SIN }\phi} - \text{COT }\phi)]}{\text{SIN }(90° - \phi\ \theta)} \text{SIN }\phi$$

Because of the movement of the wheel 15 through the toe angle $\phi$, the screen 50 will also move a slight distance so that the beam 48 is projected thereon at a small distance H from the reference line 56, this distance H being determined by the equation:

$$H = \frac{(\frac{J}{\text{COS }\phi} - J)\text{SIN }(90° + \phi)}{\text{SIN }(90° - \theta - \phi)}$$

Figure 6:
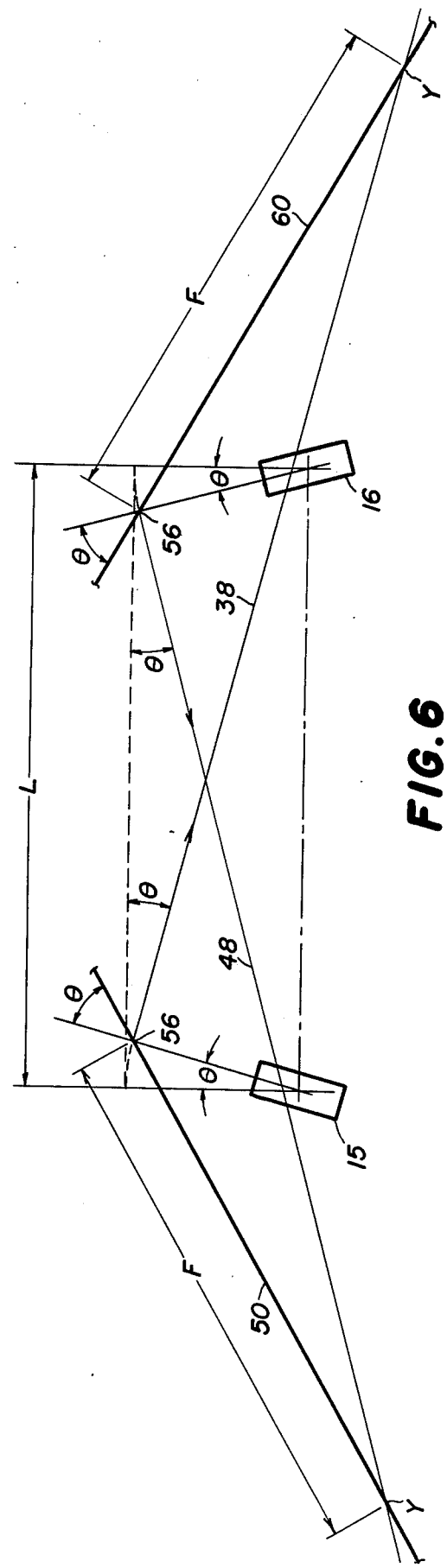
FIG. 6 is a diagrammatic view similar to FIG. 5, with both of the wheels adjusted to the proper toe-in angle.

The right front wheel 16 is then adjusted in the same manner, as illustrated in FIG. 6. When the wheels 15 and 16 have been properly adjusted so that one-half of the toe T is on each wheel, this total toe reading will be indicated on both screens 50 and 60. Thus, the light beams 38 and 48 will be projected at the points Y on the screens 50 and 60, which points are spaced a distance F from the reference lines 56. The dimension F, which corresponds to one-half the total toe, is determined by the following equation:

$$F = \frac{(L - 2J\ \text{SIN }\phi)(\text{SIN }\phi)}{\text{SIN }(90° - 2\phi - \theta)}$$

Figure 7:
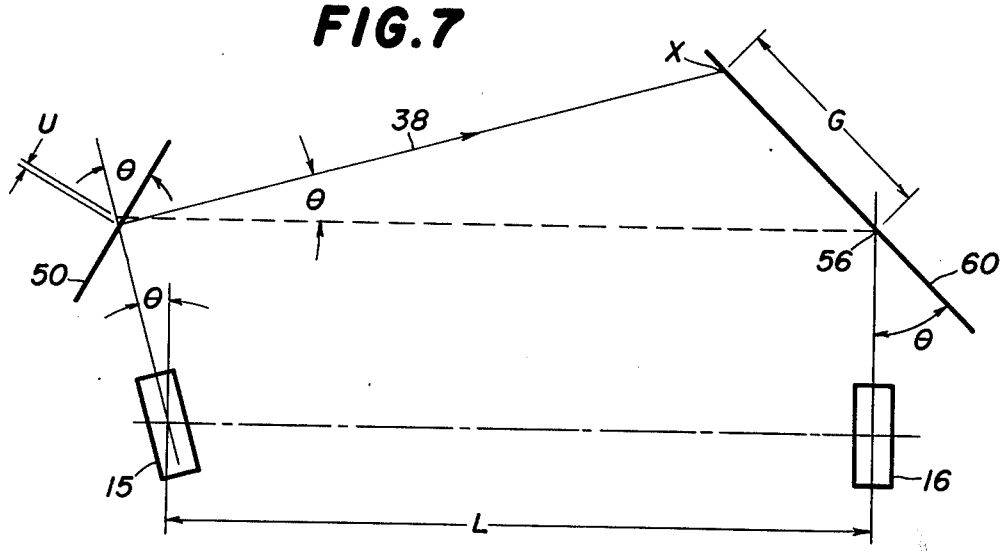
FIG. 7 is a view similar to FIG. 5 with one of the wheels adjusted to the proper toe-out angle.

Setting toe-out on the wheels 15 and 16 is accomplished in a similar manner. Referring to FIG. 7, with the left wheel turned out through the angle $\phi$, the light beam 38 will be projected at the point X on the screen 60, which is spaced from the reference line 56 by a distance G, which is determined by the following equation:

$$G = \frac{L\ \text{SIN }\phi + J(1 - \text{COS }\phi)}{\text{SIN }(90° + \theta - \phi)}$$

This tilting of the wheel 15 through the angle $\phi$ will cause the light beam 48 to be projected on the screen 50 at a point which is spaced from the reference line 56 thereon by a distance U, determined by the equation:

$$U = \frac{\left(\frac{J - J}{\text{COS }\phi}\right)\text{SIN }(90° - \phi)}{\text{SIN }(90° + \phi - \theta)}$$

When both tires are set at the proper angle $\phi$, the light beams 38 and 48 strike the screens 50 and 60 at points W which are spaced from the reference lines 56 by a distance V, determined by the equation:

$$V = \frac{\text{SIN }\phi\ (L + 2J\ \text{SIN }\phi)}{\text{SIN }(90° + \theta - 2\phi)}$$

It will be appreciated that, by the foregoing equations, the proper spacing of the toe increment lines 57, 58 and 59 on the screens 50 and 60 can readily be determined, since the dimensions L. J and the angle $\theta$ will be predetermined constants.

As an example, let $\theta = 45°$, L=60 inches, D=28 inches, J=19 inches, and T=0.125 inches. Using the foregoing equations, the following values are found: $\phi = 0.1279°$, C=0.18977 inch, H=0.000067 inch, F=0,18999 inch, G=0.18906 inch, U=0.0000668 inch, and V=0.18884 inch. From these values, it can be seen that the difference between C and F and between G and V is 0.00022 inch, which is within the acceptable tolerances for toe settings.

While the present invention has been described in connection with a two-projector system, it will be understood that the angled screens of the present invention could also be used with a single projector system used with a mirror in place of one of the screens, with the exception that the equations would have to be adjusted to take account of the reflected angle at each setting point.

From the foregoing, it can be seen that there has been provided a novel optical toe measurement system having angled screens which afford high visibility and great convenience in use, overcoming the disadvantages of the prior art systems.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for measuring the toe of a vehicle front wheel, said apparatus comprising:
    an elongated support arm,
    means fixedly mounting said arm with respect to the wheel with said arm extending forwardly of the wheel and parallel to a plane which is perpendicular to the axis of the wheel,
    a light beam projector fixedly carried by said arm adjacent to the forward end thereof so that the direction of the light beam is dependent upon the toe of the wheel, and a screen spaced from said projector for receiving the light beam projected therefrom and disposed at a predetermined acute angle with respect to the axis of the wheel so as to face toward and be clearly visible from a toe-adjusting location inboard of the wheel, whereby the toe of the wheel is indicated by the location at which said light beam is projected upon said screen.

2. The apparatus set forth in claim 1, wherein said predetermined angle is approximately 45°.

3. The apparatus set forth in claim 1, wherein said screen is disposed in use below the level of said arm.

4. The apparatus set forth in claim 1, wherein said arm is fixedly mounted with respet to the axis of the wheel.

5. Apparatus for measuring the toe of a pair of vehicle front wheels, said apparatus comprising:

a pair of elongated support arms respectively associated with the wheels, means fixedly mounting each of said arms with respect to its associated wheel with said arm extending forwardly of the wheel and parallel to a plane which is perpendicular to the axis of the wheel, a pair of light beam projectors respectively fixedly carried by said arms adjacent to the forward ends thereof and disposed in generally facing relationship with each other so that the direction of each light beam is dependent upon the toe of the associated wheel, and a pair of screens respectively carried by said arms and respectively disposed at predetermined acute angles with respect to the axes of the associated wheels, each said screen being positioned to display thereon the light beam projected from the opposite projector while facing toward and being clearly visible from a toe-adjusting location between the wheels, whereby the toe of each wheel is indicated by the location at which its associated light beam is projected upon the opposite screen.

6. The apparatus set forth in claim 5, wherein said predetermined acute angles are approximately 45°.

7. The apparatus set forth in claim 5, wherein each of said screens is suspended below the associated arm.

8. Apparatus for measuring the toe of a pair of vehicle front wheels, said apparatus comprising:

a pair of elongated support arms respectively associated with the wheels, means fixedly mounting each of said arms with respect to its associated wheel with said arm extending forwardly of the wheel and parallel to a plane which is perpendicular to the axis of the wheel, a pair of light beam projectors respectively fixedly carried by said arms adjacent to the forward ends thereof and disposed in generally facing relationship with each other so that the direction of each light beam is dependent upon the toe of the associated wheel, and a pair of screens respectively carried by said arms and respectively disposed at predetermined acute angles with respect to the axes of the associated wheels, each said screen being positioned to display thereon the light beam projected from the opposite projector while facing toward and being clearly visible from a toe-adjusting location between the wheels, each of said screens having indicia thereon comprising a plurality of vertical toe increment lines respectively corresponding to toe angles and spaced apart by distances which are a predetermined multiple of the corresponding actual toe increment to facilitate reading of the indicia, the position of each light beam with respect to the vertical toe increment lines of the opposite screen indicating the toe of the wheel associated with said light beam.

9. The apparatus set forth in claim 8, wherein the toe angle of each projector beam is subtended along the opposite screen a horizontal distance F determined by the relationship $$F = \frac{(L - 2J \sin \phi)(\sin \phi)}{\sin(90° - 2\phi - \theta)}$$

where L is the distance between the centers of the wheels, J is the distance between each wheel axis and the beam axis of the corresponding projector, $\phi$ is the toe angle of the wheel and $\theta$ is said predetermined acute angle.

* * * * *

UNITED STATES PATENT AND TRADEMARK OFFICE
CERTIFICATE OF CORRECTION

PATENT NO. : 4,168,909

DATED : September 25, 1979

INVENTOR(S) : Knudsen et al.

It is certified that error appears in the above-identified patent and that said Letters Patent are hereby corrected as shown below:

In the Drawings:

Sheet 2, FIG. 7, the Greek symbols "Θ" designating the angle opening upwardly from the wheel 15 and the angle between the line 38 and the dashed line, should both be --$\phi$--.

Figure 8:
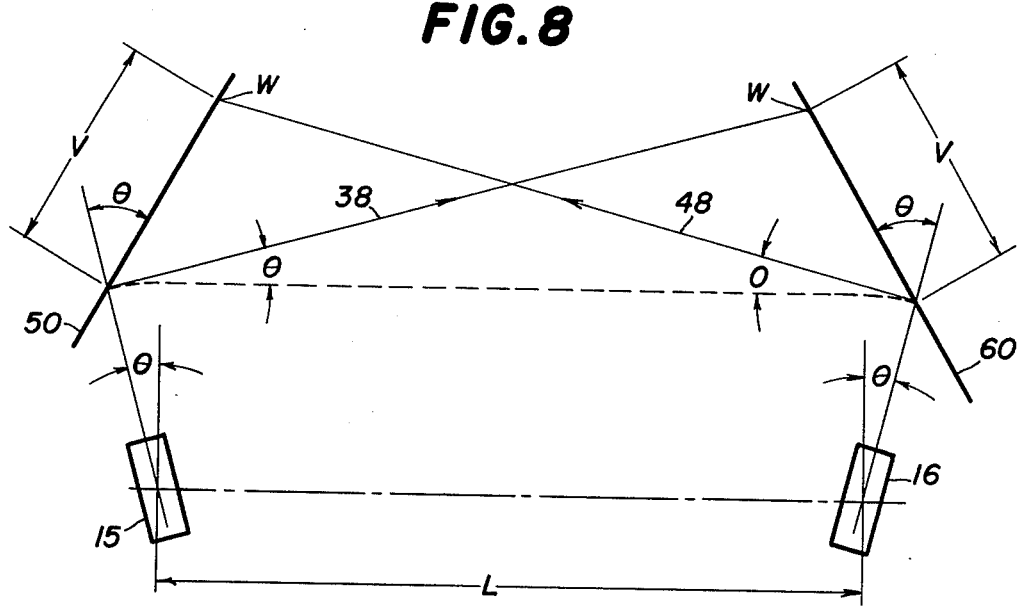
FIG. 8 is a view similar to FIG. 7 with both of the wheels adjusted to the proper toe-out angle.

FIG. 8, the Greek symbols "Θ" designating the angles opening upwardly from the wheels 15 and 16 and the angle between the line 38 and the dashed line should all be --$\phi$--; the reference symbol "0" designating the angle between the line 48 and the dashed line should be --$\phi$--.

Sheet 3, FIG. 5, the Greek symbols "Θ" designating the angle opening upwardly from the wheel 15 and the angle between the lines 38 and 48 should both be --$\phi$--.

FIG. 6, the Greek symbols "Θ" designating the angles opening upwardly from the wheels 15 and 16, the angle between the line 38 and the dashed line and the angle between the line 48 and the dashed line should all be --$\phi$--.

UNITED STATES PATENT AND TRADEMARK OFFICE
CERTIFICATE OF CORRECTION

PATENT NO. : 4,168,909
DATED : September 25, 1979
INVENTOR(S) : Knudsen et al.

It is certified that error appears in the above-identified patent and that said Letters Patent are hereby corrected as shown below:

Column 5, line 35, that portion of the equation reading "SIN (90° - $\phi\Theta$)" should read --SIN (90° - $\phi$ - $\Theta$)--;

line 45, that portion of the equation reading "$(\frac{J}{\cos \phi} J)$" should read --$(\frac{J}{\cos \phi} - J)$--.

Column 6, line 10, that portion of the equation reading "$(\frac{J - J}{\cos \phi})$" should read --$(\frac{J}{\cos \phi} - J)$--.

Signed and Sealed this

First Day of December 1981

[SEAL]

Attest:

*Attesting Officer*

GERALD J. MOSSINGHOFF

*Commissioner of Patents and Trademarks*